United States Patent [19]

West

[11] 4,450,263
[45] May 22, 1984

[54] FLUOROPOLYMER GUM OF VINYLIDENE FLUORIDE, HEXAFLUOROPROPENE, AND BROMODIFLUOROETHYLENE

[75] Inventor: Arthur C. West, Maplewood, Minn.

[73] Assignee: Minnesota Mining and Manufacturing Company, St. Paul, Minn.

[21] Appl. No.: 182,608

[22] Filed: Aug. 29, 1980

Related U.S. Application Data

[62] Division of Ser. No. 70,926, Aug. 30, 1979, Pat. No. 4,263,414.

[51] Int. Cl.$^3$ .................... C08F 14/16; C08F 14/22; C08F 14/28
[52] U.S. Cl. .................................... 526/249; 526/254; 526/255; 525/102
[58] Field of Search ........................................ 526/249

[56] References Cited

U.S. PATENT DOCUMENTS 4,035,565 7/1977 Apotheker et al. ............... 526/249
4,214,060 7/1980 Apotheker et al. ............... 525/387

*Primary Examiner*—Wilbert J. Briggs, Sr.
*Attorney, Agent, or Firm*—Cruzan Alexander; Donald M. Sell; William G. Ewert

[57] ABSTRACT

A fluoropolymer gum of 60 to 85 mol percent vinylidene fluoride, 10 to 40 mol percent of hexafluoropropene and 0.15 to 3 mol percent 1-bromo-2,2-difluoroethylene is provided which can be blended with fluorosilicone gum and vulcanized in presence of free-radical initiators to produce elastomeric vulcanizates with desired balance of chemical solvent or fluid resistance, high temperature stability, and low temperature flexibility, coupled with good physical properties such as high tensile strength and elongation.

3 Claims, No Drawings

FLUOROPOLYMER GUM OF VINYLIDENE FLUORIDE, HEXAFLUOROPROPENE, AND BROMODIFLUOROETHYLENE

This application is a division application of U.S. Ser. No. 70,926, filed Aug. 30, 1979 now U.S. Pat. No. 4,263,414.

This invention relates to vulcanizable blends of fluoropolymer and fluorosilicone gums and to shaped articles made of vulcanized elastomers of such blends.

Fluoroelastomers, particularly the copolymers of vinylidene fluoride (commonly abbreviated as $VF_2$) with other ethylenically unsaturated halogenated monomers, such as $C_3F_6$ (hexafluoropropene, commonly abbreviated as HFP), $C_3F_5H$, $C_2F_3Cl$, and $C_2F_4$, have become the polymers of choice for high temperature applications, such as seals, gaskets, and linings, especially when shaped articles thereof are subject to exposure to aggressive or harsh environments, such as solvents, lubricants, and oxidizing or reducing conditions. Such fluoroelastomers in general can be compounded and cured to have high tensile strength, good tear resistance, and low compression set.

The major drawback to many applications of shaped articles made of such fluoroelastomers has been their inability to satisfactorily function at low temperatures. At temperatures only slightly below 0° C., the articles become stiff and fail to perform satisfactorily. For example, many automotive applications require useful performance at $-30°$ C., preferably $-40°$ C., and the present commercially available fluoroelastomers qualify for use only in a few very special applications where low temperatures do not materially affect the performance of the elastomers. Recent employment of required pollution control devices on automobile engines has resulted in higher and higher temperatures in the vicinity of the engines, and the need for materials that can operate for extended periods at elevated temperatures is becoming even more imperative.

Conventional cured fluoroelastomers with a mol percent composition of $VF_2$:HFP of 70–85:15–30 or a mol percent composition of $VF_2$:HFP:$C_2F_4$ of 56–68:12–24:18–22 have low temperature retraction values ($TR_{10}$) of $-17°$ to $-18°$ C. and use temperatures (the lowest temperature at which an elastomeric seal is operable) of no more than 10° C. lower, depending somewhat upon the use. Minor changes in monomer composition can lower the $TR_{10}$ values slightly; for example, a commercial fluoroelastomer having a mol percent composition $VF_2$:HFP:$C_2F_4$ of 57–61:27–31:10–14 provides a $TR_{10}$ value of about $-19°$ C. Another commercial fluoroelastomer having the composition $VF_2$:$C_2F_4$:$C_2F_3OCF_3$ provides a $TR_{10}$ value of $-28°$ C.; its cost is so high that it has only minor usage compared to present commercial fluoroelastomer.

At about the same time as fluoroelastomers were developed, another new type of elastomer became commercially important—the polysiloxanes or silicones. Shaped articles of these polymers perform at high temperatures, but additionally they have good physical properties at extremely low temperatures, functioning satisfactorily as low as $-60°$ C. or below. Unfortunately the solvent resistance of the silicones is quite poor, and performance in the presence of solvents, fuels, and lubricants is quite limited. The polyfluorosilicones, particularly those containing trifluoropropyl radicals attached to the silicon atoms, have somewhat improved solvent resistance, but are still inadequate where both high temperature and aggressive solvent environments are encountered.

Over the years a variety of attempts have been made to combine the two classes of polymers, but with very limited success. Publications of such attempts include U.S. Pat. No. 3,415,900 (Robb) which discloses vulcanizing a compounded mixture comprising a fluoroelastomer, such as a $VF_2$/HFP copolymer, a silicone rubber, such as phenyl, methyl, or vinyl siloxane rubbers and their halo-substituted derivatives, and a peroxy vulcanization catalyst. U.S. Pat. No. 3,538,028 (Morgan) discloses vulcanizing a mixture comprising a $VF_2$/HFP copolymer, a silicone gum such as a copolymer of dimethyl siloxane and trifluoropropyl-siloxane, amine accelerators, and peroxy catalysts. U.S. Pat. No. 3,969,308 (Penneck) discloses blending a polymer, such as $VF_2$/HFP copolymer, a silicone polymer such as 3,3,3-trifluoropropyl methyl siloxane, a silane-treated inorganic silicon compound containing Si-O-Si groups, and a peroxy initiator. U.S. Pat. No. 4,028,431 (Futami et al) discloses a blend consisting essentially of a fluorine containing ethylene copolymer, a silicone rubber and/or fluorine containing copolymer such as $VF_2$/HFP copolymer, and peroxide. British Patent Specification No. 1,284,081 (Raychem Ltd.) discloses a blend of fluorohydrocarbon polymer such as a $VF_2$/HFP copolymer, and a silicone polymer such as 3,3,3-trifluoropropyl methyl siloxane. Technical Report AFML-TR-74-92, September, 1974, of the U.S. Air Force Materials Laboratory discloses peroxidecurable blends of an experimental fluorocarbon elastomer described as LD-487 and a fluorosilicone gum sold under the trademark "Silastic" LS-420.

As the foregoing publications show, the customary approach has been to blend the two elastomer gums together and to vulcanize the mixture, sometimes each gum stock having its own curing system and at times a single curing system "suitable" for both. In no case has a commercially satisfactory "cocured" product been obtained suitable for commercial use with a combination of high temperature stability, low temperature flexibility, and solvent resistance.

Problems arise primarily because the two classes of polymers are generally incompatible and have different curing characteristics. The silicones are customarily cured by means of organic peroxides at preset temperatures of 100°–150° C. Fluoroelastomers are usually cured by amines or by diphenol systems, both of which systems are generally incompatible with silicone cures. Peroxide cures have been used for fluoroelastomers in the past and attempts have been made to cocure mixtures of silicones and fluoroelastomers with peroxide initiators. None of the attempts have resulted in properties good enough for practical use.

According to this invention, there is provided a novel blend of certain fluoropolymer gums with fluorosilicone gums, both of which gums cure in the presence of free-radical initiators under vulcanization conditions to produce an elastomeric vulcanizate with a desired balance of chemical and solvent or fluid resistance, high temperature stability, and low temperature utility.

Although blending the fluoropolymer gum with a small amount of fluorosilicone gum (say about 5 parts or less) provides improvement in $TR_{10}$ value over that provided by the fluoropolymer gum per se, the advantages of such improvement will be outweighed by cost disadvantages in preparing blends with such small amount of fluorosilicone gum. Thus, the fluoropolymer gum:fluorosilicone gum weight ratio in the novel blends of this invention will be in the range of 90:10 to 20:80. Low amounts of the fluoropolymer gum component in these blends usually are difficult to homogeneously disperse in the correspondingly high amounts of the relatively softer fluorosilicone gum; some types of commercial reinforcing fillers assist in overcoming this difficulty and the vulcanizates prepared from such blends have mechanical properties and thermal stabilities which are superior to those prepared from the unblended fluorosilicone gum. The more preferred blends of this invention for many applications will have a fluoropolymer:fluorosilicone weight ratio in the range of 90:10 to 60:40.

The fluoropolymers used in this invention are copolymers whose interpolymerized units consist essentially of 60 to 85 mol percent of units derived from vinylidene fluoride, 10 to 40 mol percent of units derived from hexafluoropropene, and 0.15 to 3 mol percent of units derived from one or more bromine-containing copolymerizable olefins, based on the total moles of interpolymerized units. While up to 10 mol percent of units derived from other highly fluorinated olefins, such as trifluoroethylene, trifluorochloroethylene and tetrafluoroethylene, can be included in the copolymer, the resulting vulcanized products made from blends containing such highly fluorinated olefins tend to have surprisingly poorer physical properties and low temperature performance as compared to blends made with the fluoropolymers which are free of said other fluorinated olefins. Similarly, blends containing copolymerizable fluorinated monomers with lower levels of fluorine, such as vinyl fluoride, tend to give vulcanizates with less resistance to solvents and aggressive chemicals. The first three named monomers are the sole essential comonomers of the fluoropolymer used in this invention, i.e., the fluoropolymer components consists essentially of interpolymerized units derived from $VF_2$, HFP, and bromine-containing olefin. The preferred fluoropolymers are those whose interpolymerized units consists of 65 to 82 mol percent of units derived from $VF_2$, 17 to 35 mol percent of units derived from HFP, and 0.2 to 0.6 mol percent of units derived from bromine-containing olefin.

The copolymerizable bromine-containing olefins used in this invention include terminally unsaturated olefins of two to four carbon atoms in which at least one hydrogen atom is substituted by bromine and optionally one or more of the remaining hydrogen atoms have been replaced by fluorine. Such olefins include 4-bromo-perfluorobutene-1, vinyl bromide, pentafluoroallyl bromide, 4-bromo-difluorobutene-1, 2-bromoheptafluorobutene-1, 3-bromoheptafluorobutene-1, difluoroallyl bromide, bromotrifluoroethylene and 1-bromo-2,2-difluoroethylene, the latter two being the preferred bromine-containing olefins to be used in preparing the fluoropolymer component. Where the bromine-containing olefin used to make the fluoropolymer is 1-bromo-2,2-difluoroethylene, the subsequently cured fluoropolymer/fluorosilicone blend has higher tensile strength and elongation as compared to cured blends where bromotrifluoroethylene is used to make the fluoropolymer, as shown by the tabulated data in the examples hereinafter described.

A number of the fluoropolymers useful as blend components in this invention are known. The fluoropolymers can be prepared by known polymerization techniques, for example that described in U.S. Pat. No. 4,035,565 (Apotheker et al). Briefly, the fluoropolymers are prepared by charging a stainless steel pressure reactor with reaction diluent, pH buffer, emulsifier, initiator, and the comonomers; carrying out the emulsion polymerization of the charge at constant elevated temperature and pressure, with agitation; coagulating the resulting latex; and filtering, washing, and drying the resulting fluoropolymer gum.

As a representative example, a $VF_2$/HFP/bromodifluoroethylene fluoropolymer gum can be prepared according to the above procedure by charging the following ingredients, in order, to a one-gallon, stainless, steel, stirred reactor:

| | |
|---|---|
| Deionized water | 3670 g |
| $K_2HPO_4$ | 16 |
| Perfluorooctanoic acid | 15.7 |
| $K_2S_2O_8$ | 4 |
| HFP | 28 |
| Monomer blend | 1431 |
| $VF_2$ | 78.3 mol % |
| HFP | 21.4 mol % |
| 1-Bromo-2,2-difluoroethylene | 0.3 mol % |

The reaction mixture is polymerized at 68° C. and 1.3 MPa with an agitation speed of 700 rpm for about 10 hours. A portion of resulting latex (3200 g) is added dropwise to an aqueous solution containing 1200 g deionized water, 18 g $CaCl_2$, and 21 g $H_3PO_4$. After coagulation is complete, the raw gum is washed 5 times with hot deionized water (about 60° C.). Excess water is removed, and the raw gum and is dried overnight at 116° C.

The preferred fluorosilicone gums to be blended with the above-described fluoropolymer gums are poly(trifluoropropyl)methylsiloxanes which has a linear backbone of Si-O-repeating units with principally trifluoropropyl radicals (i.e. $CF_3CH_2CH_2-$) and methyl radicals and a minor amount of vinyl radicals attached to silicon atoms in the backbone. Fluorosilicone polymers classified as "FVMQ" according to ASTM D-1418 are suitable. Commercially available fluorosilicone rubbers which can be used are sold under the trademark "Silastic", viz. "Silastic" LS 422, LS-420, and LS-53, and one sold as FSE-2120, all of which are silicone polymers having trifluoropropyl, methyl and vinyl substitutents attached to the silicon atoms—see Dow Corning Company bulletins 09-242, October, 1968, and 17-029, June 1971, and General Electric Company bulletin of February, 1978, on FSE-2120. The molecular weight of the fluorosilicone gums used as blend components in this invention can vary widely. Commericial fluorosilicone gums generally have a relatively low viscosity, e.g. an intrinsic viscosity e.g. an inherent viscosity (0.2 g/deciliter in acetone at 25° C.) of about 0.1

Any of the conventional "free-radical" generating cure initiators can be used in the vulcanization or curing of the fluoropolymer/fluorosilicone blend, such as actinic radiation, electron beam, and organic or inorganic peroxides; organic peroxides are preferred, particularly those which are stable at temperatures below about 50° C. and which decompose at a reasonable rate below about 200° C. Suitable peroxides include benzoyl peroxide, bis(2,4 dichlorobenzoyl) peroxide, dicumyl peroxide, 2,5-dimethyl-2,5-di(t-butylperoxy)hexane, t-butylhydroperoxide, di-t-butyl peroxide, t-butylperoxy benzoate, 2,5-dimethyl-2,5-di(t-butylperoxy)hexyne-3 and lauroyl peroxide. Particularly useful commercially available peroxides are 2,5-dimethyl-2,5-bis(t-butylperoxy)hexane and 2,5-dimethyl-2,5-bis(t-butylperoxy)-hexyne-3 which are the active ingredients of products sold as "Luperco" 101XL and 130XL, respectively. The amount of peroxide curing agent used generally will be 0.1 to 5, preferably 1 to 2, parts per 100 parts of the fluoropolymer gum/fluorosilicone gum blend.

Along with the peroxide curing agent it will generally be desirable to use a cocuring agent (or coagent), such as are commonly used in peroxide vulcanization or rubbers to obtain a tighter or faster cure or better compression set. Such cocuring agents generally will be used in amounts of 1 to 10, preferably 1 to 5, parts per 100 parts of the fluoropolymer gum/fluorosilicone gum blend. Cocuring agents which can be used include triallyl cyanurate, diallyl phthalate, allyl methacrylate and, particularly, triallyl isocyanurate.

In many cases, for optimum vulcanizate physical properties, such as tensile strength, it will be desirable to include in the blend finely divided silica as a reinforcing filler, e.g., 5 to 60 parts by weight per 100 parts by weight of the fluoropolymer/fluorosilicone admixture. The silica reinforcing fillers used for this purpose can be the same as those recommended by manufacturers of fluorosilicones as fillers therefor, such as those sold as "Cab-O-Sil" HS-5, "Aerosil" R-972, and "Quso" G-32.

In preparing the blend of this invention, it will usually be convenient to combine the fluoroelastomer gum and the silicone gum, then add the required or desired reinforcing fillers, such as silica, iron oxide, and zinc oxide, pigments, such as chrome oxide, iron oxide, and titanium oxide, acid acceptors, such as magnesium oxide and calcium hydroxide, plasticizers, and processing aids which are compatible with the gums and mix well therewith, with the peroxide and cocuring agent (if used) being mixed in as the final step. For example, a two-roll mill can be used, preferably water-cooled to prevent the gumstock from scorching. The fluorocarbon polymer gum can be first banded on the mill and then the silicone gum blended in until uniform, or the two gums can be banded together. The balance of compounding adjuvants can then be milled in as a mixture. Generally, the compounded, vulcanizable mixture or gumstock is extruded or molded in a cavity or transfer mold at a temperature in the range of 125° to 250° C. for 1 to 50 minutes or more at about 5 to 10 MPa. The extruded or press-cured article is then transferred to a circulating air oven and post-cured at about 170 to 230° C. for about 2 to 24 hours, preferably at about 200° C. for 16 hours, yielding cured (that is, cross-linked or vulcanized) shaped articles which are elastomeric (i.e., materials which, when slowly stretched at room temperature to at least twice their original length and released, return rapidly to essentially their original length).

The vulcanizable blends of this invention can be employed in making molded or extruded articles of manufacture which are especially valuable in applications requiring performance over a broad temperature range, including those requiring high temperature stability and low temperature utility, such as gaskets, O-rings, diaphragms, tubing, ducting, carburetor fuel tips, fuel pump cups, shaft seals, and the like. The vulcanized blends are suitable in applications requiring high chemical resistance, such as conditions encountered by fabricated articles in aircraft hydraulic system seals, heat exchangers, pumps, carburetors, and the like.

This invention provides a composite gumstock, at a relatively low cost, which can be vulcanized to elastomers with a $TR_{10}$ value sufficiently low to enable articles of such vulcanized elastomer to be used in low temperature environments, some types of these elastomers having $TR_{10}$ values of about $-10°$ C. to $-25°$ C. or lower, those having $TR_{10}$ values of about $-20°$ C. to $-25°$ C. being especially useful in automative applications. These low temperature properties are coupled with good physical properties, initially and after exposure to elevated temperatures, resistance to aggressive fluids, and resistance to compression set. For example, as shown in the tables below, exemplary vulcanizates of this invention have $TR_{10}$ values of $-10°$ C. or lower, many being lower than $-20°$ C. and post-cured tensile strengths of at least about 7 MPa, most being above 9 Mpa.

Objects and advantages of this invention are illustrated in the following examples, where the parts referred to are parts by weight unless indicated otherwise. The press-cured sheets, unless otherwise noted, were 150 mm × 150 mm × 2 mm sheets pressed at about 7 MPa for 15 minutes at 177° C. The post-cured sheets were those removed from the press and placed for 16 hours in a circulating air oven having a temperature maintained at 200° C. The accelerated aging was carried out according to ASTM D 573-67, the samples being exposed for the indicated time at the indicated temperature. Compression set was determined in accordance with ASTM D 395-69B using 15 mm diameter O-rings 3.5 mm thick compressed to 2.6 mm under the indicated conditions. Tensile strength, elongation at break, and modulus at 100 percent elongation were measured in accordance with ASTM D 412-75, using Die D. Hardness was measured in accordance with ASTM D 2240-75, using Durometer A and taking readings 2 seconds after the presser foot came into contact with the specimen. Volume swell was measured in accordance with ASTM-471-75, the change in volume after immersion in Reference Fuel C (equal volumes of isooctane and toluene), after 70 hours at 70° C., being measured in duplicate by the water displacement method. The $TR_{10}$ values, indicating utility at low temperature, were measured in accordance with ATSM D 1329-72 and are temperatures at which the specimen retracts 10% of its stretched length.

EXAMPLES

In accordance with this invention, a number of fluoropolymer gums (some of which were prepared as described above and some of which were obtained from commercial sources) were blended with commerically available fluorosilicone gums and certain compounding adjuvants, the resulting gumstocks were vulcanized, and the resulting vulcanizates were tested. For purposes of comparison, other gumstocks outside the scope of this invention were prepared, vulcanized, and tested. This work is summarized in the Tables I through V below, Table I setting forth the compositions of the fluoropolymers used, Table II setting forth the composition of the compounded gumstocks of this invention, Table III setting forth the composition of the comparison gumstocks, Table IV setting forth the properties of the vulcanized gumstocks of this invention, and Table V setting forth the properties of the comparison vulcanized gumstocks.

To illustrate further aspects of this invention, in a series of seven runs, fluoropolymer A (whose composition is set forth in Table I) was blended with varying amounts of fluorosilicone gum and various other compounding adjuvants, the blends were press-cured at 177° C. for 15 minutes at 5 MPa, post-cured at 200° C. for 16 hours, heat aged for different periods of time at 200° C. and 232° C. and the properties of the various cured and aged vulcanizates were determined. These runs are summarized in Table VI.

TABLE I

| Fluoropolymer gums used in this invention | Composition, mol % | | | | | | |
|---|---|---|---|---|---|---|---|
| | $VF_2$ | HFP | $C_2F_3Br$ | $C_2HF_2Br$ | $C_2HF_3$ | $C_2F_4$ | $C_2F_3OCF_3$ |
| A | 75.9 | 23.6 | 0.5 | | | | |
| B | 78.4 | 21.3 | | 0.3 | | | |
| C | 65.9 | 33.5 | 0.6 | | | | |
| D | 67.0 | 32.6 | 0.4 | | | | |
| E | 80.0 | 9.7 | 0.4 | | | 9.9 | |
| F | 78.1 | 20.1 | 1.8 | | | | |
| Comparison fluoropolymer gums | | | | | | | |
| G | 55.4 | 24.2 | 1.4 | | 19.0 | | |
| H | 76.1 | 20.0 | 3.9 | | | | |
| I | 83.8 | 9.0 | 7.2 | | | | |
| J* | 64.2 | 17.0 | 0.3 | | | 18.5 | |
| K* | 53.9 | 19.6 | 0.4 | | | 26.1 | |
| L* | 74.3 | | | | | 10.3 | 15.4 |
| M* | 74.2 | | 0.5 | | | 7.7 | 17.6 |

*These fluoropolymer gums were obtained commercially, gum L being designated LD-487.

TABLE II

| Gumstock ingredients, parts | Gumstocks of Invention | | | | | | | | | | |
|---|---|---|---|---|---|---|---|---|---|---|---|
| | 1 | 2 | 3 | 4 | 5 | 6 | 7 | 8 | 9 | 10 | 11 |
| Fluoropolymer gum | | | | | | | | | | | |
| A | 60 | 60 | | | | | 80 | | | | |
| B | | | 60 | | | | | 80 | | | |
| C | | | | 60 | | | | | | | |
| D | | | | | 60 | | | | 80 | | |
| E | | | | | | 60 | | | | 80 | |
| F | | | | | | | | | | | 80 |
| Fluorosilicone gum[a] | 40 | 40 | 40 | 40 | 40 | 40 | 20 | 20 | 20 | 20 | 20 |
| Silica[b] | 26.5 | 26.5 | 26.5 | 26.5 | 26.5 | 26.5 | 15 | 15 | 15 | 15 | 15 |
| Iron oxide[c] | | | | | | | 2.5 | 2.5 | 2.5 | 2.5 | 2.5 |
| Calcium hydroxide | 3 | 3 | 3 | 3 | 3 | 3 | | | | | |
| Peroxide[d] | 1.3 | 1.3 | 1.3 | 1.3 | 1.3 | 1.3 | 1.4 | 1.4 | 1.4 | 1.4 | 1.4 |
| Triallyl isocyanurate | 1.2 | 1.2 | 1.2 | 1.2 | 1.2 | 1.2 | 1.6 | 1.6 | 1.6 | 1.6 | 1.6 |

[a]"Silastic" LS-420
[b]Silica in gumstocks 1–6 was 20 parts "Aerosil" R-972 and 6.5 parts "Cab-O-Sil" HS-5, and in gumstocks 7–11 the silica was solely "Aerosil" R-972
[c]"Mapico" 297
[d]Peroxide in gumstocks 1 and 3 was "Luperco" 101XL and in gumstocks 2, 4–11 it was "Luperco" 130XL

TABLE III

| Gumstock ingredients, parts | Comparison gumstocks | | | | | | | | | | | | |
|---|---|---|---|---|---|---|---|---|---|---|---|---|---|
| | 12 | 13 | 14 | 15 | 16 | 17 | 18 | 19 | 20 | 21 | 22 | 23 | 24 |
| Fluoropolymer | | | | | | | | | | | | | |
| A | 100 | | | | | | | | | | | | |
| D | | 100 | | | | | | | | | | | |
| G | | | 60 | | | | | | | | | | |
| J | | | | 60 | | | | | 80 | | | | |
| K | | | | | 60 | | | | | | | | |
| C | | | | | | 80 | | | | | | | |
| H | | | | | | | 80 | | | | | | |
| I | | | | | | | | 80 | | | | | |
| L | | | | | | | | | | | 60 | | |
| M | | | | | | | | | | | | 60 | 80 |
| Fluorosilicone gum[a] | | | 40 | 40 | 40 | 20 | 20 | 20 | 20 | 100 | 40 | 40 | 20 |
| Silica[b] | 26.5 | 26.5 | 26.5 | 26.5 | 26.5 | 15 | 15 | 15 | 15 | 26.5 | 26.5 | 26.5 | 15 |
| Iron oxide[c] | | | | | | 2.5 | 2.5 | 2.5 | 2.5 | | | | 2.5 |
| Calcium hydroxide | 3 | 3 | 3 | 3 | 3 | | | | | 3 | 3 | 3 | |
| Peroxide[d] | 1.3 | 1.3 | 1.3 | 1.3 | 1.3 | 1.4 | 1.4 | 1.4 | 1.4 | 1.3 | 1.3 | 1.3 | 1.4 |
| Triallyl isocyanurate | 1.2 | 1.2 | 1.2 | 1.2 | 1.2 | 1.6 | 1.6 | 1.6 | 1.6 | 1.2 | 1.2 | 1.2 | 1.6 |

[a]"Silastic" LS-420
[b]Silica in gumstocks 17–20 and 24 was "Aerosil" R-972 and silica in all other gumstocks was mixture of 20 parts "Aerosil" R-972 and 6.5 parts "Cab-O-Sil" HS-5
[c]"Maipco" 297
[d]"Luperco" 130XL

TABLE IV

| | Vulcanizate products of invention*** | | | | | | | | | | |
|---|---|---|---|---|---|---|---|---|---|---|---|
| | 1 | 2 | 3 | 4 | 5 | 6 | 7 | 8 | 9 | 10 | 11 |
| Fluoropolymer gum used* | A | A | B | C | D | E | A | B | D | E | F |
| FP/FS wt. ratio** | 60/40 | 60/40 | 60/40 | 60/40 | 60/40 | 60/40 | 80/20 | 80/20 | 80/20 | 80/20 | 80/20 |
| Properties of vulcanizate: | | | | | | | | | | | |
| Press cure: | | | | | | | | | | | |
| Tensile strength, MPa | 9.52 | 9.34 | 11.36 | 10.00 | 11.06 | 10.31 | 8.16 | 9.76 | 10.34 | 9.89 | 6.87 |
| Elongation, % | 213 | 185 | 345 | 188 | 263 | 282 | 215 | 372 | 423 | 250 | 140 |
| 100% modulus, MPa | 4.14 | 5.16 | 3.30 | 5.85 | 4.93 | 4.10 | 3.07 | 3.50 | 2.24 | 4.07 | 5.49 |
| Hardness, Shore A | 74 | 76 | 75 | 81 | 80 | 75 | 69 | 77 | 68 | 83 | 68 |
| Post cure: | | | | | | | | | | | |
| Tensile strength, MPa | 10.45 | 9.96 | 13.57 | 9.84 | 10.91 | 12.08 | 9.88 | 11.95 | 11.22 | 12.11 | 7.02 |
| Elongation, % | 153 | 158 | 250 | 163 | 232 | 200 | 220 | 417 | 367 | 255 | 107 |
| 100% modulus, MPa | 5.96 | 6.38 | 4.70 | 6.14 | 5.22 | 5.41 | 3.53 | 3.42 | 2.68 | 3.74 | 6.53 |
| Hardness, Shore A | 81 | 79 | 81 | 82 | 82 | 75 | 73 | 76 | 72 | 75 | 70 |
| Compression Set: | | | | | | | | | | | |
| 70 hrs at 148° C. | — | 17 | — | 29 | 26 | 22 | 20 | 25 | 21 | 22 | 23 |
| 70 hrs at 200° C. | — | 42 | — | 58 | 60 | 59 | 53 | 56 | 56 | 53 | 67 |
| $TR_{10}$, °C. | −23.5 | −23 | −24 | −10 | −15 | −21 | −21 | −22 | −12 | −14 | −17 |
| Volume swell, vol. % | 20 | 19 | 20 | 17 | 19 | 20 | 23 | 20 | 20 | 23 | — |
| Heat Aging: | | | | | | | | | | | |
| 3 days at 200° C. | | | | | | | | | | | |
| Tensile strength, MPa | — | 9.22 | — | 10.09 | 10.82 | 11.31 | 8.91 | 13.07 | 10.13 | 10.14 | 5.21 |
| Elongation, % | — | 150 | — | 160 | 225 | 182 | 227 | 463 | 358 | 245 | 122 |
| 100% modulus, MPa | — | 6.24 | — | 6.45 | 5.32 | 6.47 | 3.24 | 2.56 | 2.81 | 4.47 | 4.38 |
| Hardness, Shore A | — | 80 | — | 81 | 81 | 82 | 70 | 63 | 71 | 82 | 66 |
| 7 days at 200° C. | | | | | | | | | | | |
| Tensile strength, MPa | — | 8.98 | — | 8.84 | 9.77 | 11.02 | 7.30 | 10.58 | 9.01 | 8.95 | 5.05 |
| Elongation, % | — | 157 | — | 148 | 220 | 185 | 242 | 438 | 385 | 263 | 133 |
| 100% modulus, MPa | — | 5.80 | — | 6.31 | 4.84 | 6.05 | 2.61 | 2.39 | 2.47 | 3.62 | 3.91 |
| Hardness, Shore A | — | 83 | — | 85 | 84 | 80 | 70 | 68 | 71 | 80 | 66 |
| 14 days at 200° C. | | | | | | | | | | | |
| Tensile strength, MPa | — | 7.39 | — | 7.53 | 9.20 | 9.05 | 6.90 | 8.39 | 7.86 | 8.24 | 5.74 |
| Elongation, % | — | 142 | — | 137 | 222 | 163 | 272 | 453 | 398 | 277 | 137 |
| 100% modulus, MPa | — | 5.56 | — | 5.47 | 4.62 | 5.43 | 2.39 | 1.92 | 2.14 | 2.59 | 4.07 |
| Hardness, Shore A | — | 83 | — | 84 | 84 | 80 | 68 | 69 | 70 | 69 | 71 |
| Heat Aging: | | | | | | | | | | | |
| 3 days at 232° C. | | | | | | | | | | | |
| Tensile strength, MPa | — | 8.03 | — | 7.56 | 9.18 | 8.38 | 5.64 | 8.03 | 6.19 | 6.41 | 4.62 |
| Elongation, % | — | 165 | — | 165 | 238 | 160 | 288 | 493 | 453 | 290 | 133 |
| 100% modulus, MPa | — | 5.34 | — | 4.92 | 4.52 | 5.25 | 1.81 | 1.52 | 1.70 | 2.98 | 3.58 |
| Hardness, Shore A | — | 78 | — | 84 | 79 | 80 | 65 | 62 | 66 | 78 | 72 |
| 7 days at 232° C. | | | | | | | | | | | |
| Tensile strength, MPa | — | 5.43 | — | 4.25 | 5.81 | 5.05 | 5.25 | 7.19 | 5.24 | 6.05 | 5.18 |
| Elongation, % | — | 163 | — | 148 | 243 | 148 | 332 | 543 | 503 | 315 | 122 |
| 100% modulus MPa | — | 3.90 | — | 3.21 | 3.13 | 3.23 | 1.66 | 1.30 | 1.52 | 2.48 | 4.56 |
| Hardness, Shore A | — | 79 | — | 84 | 82 | 77 | 68 | 60 | 65 | 75 | 78 |
| 14 days at 232° C. | | | | | | | | | | | |
| Tensile strength, MPa | — | 3.17 | — | 3.15 | 3.03 | 3.34 | 6.17 | 7.39 | 5.45 | 5.61 | 3.91 |
| Elongation, % | — | 168 | — | 117 | 238 | 168 | 340 | 548 | 533 | 302 | 78 |
| 100% modulus, MPa | — | 2.38 | — | 3.01 | 2.12 | 2.50 | 2.33 | 1.43 | 1.48 | 1.70 | — |
| Hardness, Shore A | — | 80 | — | 82 | 80 | 76 | 76 | 68 | 67 | 66 | 77 |

*Fluoropolymer designations A, B, etc., correspond to those in Table I
**FP/FS means fluoropolymer gum/fluorosilicone gum ratio
***The numbered designations of the vulcanized products correspond to the numbered designations of the gumstocks of Table II

TABLE V

| | Comparison vulcanizate products** | | | | | | | | | | | | |
|---|---|---|---|---|---|---|---|---|---|---|---|---|---|
| | 12 | 13 | 14 | 15 | 16 | 17 | 18 | 19 | 20 | 21 | 22 | 23 | 24 |
| Fluoropolymer gum used* | A | D | G | J | K | C | H | I | J | None | L | M | M |
| FP/FS wt. ratio | 100/0 | 100/0 | 60/40 | 60/40 | 60/40 | 80/20 | 80/20 | 80/20 | 80/20 | 0/100 | 60/40 | 60/40 | 80/20 |
| Properties of vulcanizate: | | | | | | | | | | | | | |
| Press cure: | | | | | | | | | | | | | |
| Tensile strength, MPa | 12.91 | 14.42 | 6.30 | 5.10 | 5.73 | 8.51 | 5.32 | 3.23 | 6.07 | 6.09 | 6.68 | 10.18 | 11.22 |
| Elongation, % | 277 | 417 | 172 | 76 | 115 | 293 | 87 | 73 | 233 | 152 | 250 | 268 | 560 |
| 100% modulus, MPa | 4.56 | 4.36 | 3.25 | — | — | 2.35 | — | — | 3.13 | 3.67 | 4.44 | 4.40 | 2.01 |
| Hardness, Shore A | 76 | 87 | 73 | 83 | 77 | 69 | 67 | 65 | 73 | 62 | 78 | 78 | 64 |
| Post cure: | | | | | | | | | | | | | |
| Tensile strength, MPa | 14.08 | 17.90 | 6.13 | 6.56 | 5.50 | 9.99 | 3.73 | 2.98 | 5.92 | 4.87 | 8.87 | 10.66 | 12.53 |
| Elongation, % | 210 | 250 | 125 | 90 | 85 | 275 | 75 | 40 | 210 | 125 | 303 | 222 | 527 |
| 100% modulus, MPa | 5.98 | 7.01 | 4.53 | — | — | 2.88 | — | — | 3.50 | 3.62 | 4.62 | 5.20 | 2.01 |
| Hardness, Shore A | 79 | 87 | 76 | 85 | 80 | 73 | 71 | 72 | 77 | 63 | 80 | 80 | 65 |
| Compression set: | | | | | | | | | | | | | |
| 70 hrs at 148° C. | 16 | 35 | 23 | 26 | — | 20 | 44 | 68 | 39 | 17 | 47 | 33 | 35 |
| 70 hrs at 200° C. | 35 | 64 | 51 | 50 | — | 63 | 100 | — | 78 | 68 | 73 | 69 | 74 |

TABLE V-continued

| | Comparison vulcanizate products** | | | | | | | | | | | | |
|---|---|---|---|---|---|---|---|---|---|---|---|---|
| | 12 | 13 | 14 | 15 | 16 | 17 | 18 | 19 | 20 | 21 | 22 | 23 | 24 |
| Fluoropolymer gum used* | A | D | G | J | K | C | H | I | J | None | L | M | M |
| FP/FS wt. ratio | 100/0 | 100/0 | 60/40 | 60/40 | 60/40 | 80/20 | 80/20 | 80/20 | 80/20 | 0/100 | 60/40 | 60/40 | 80/20 |
| $TR_{10}$, °C. | −19 | −8 | −11 | −21 | −14 | −5 | — | — | −17 | −68 | −35 | −34 | −33 |
| Volume swell, vol. % | 17 | 17 | 23 | 18 | — | 20 | — | — | 18 | 27 | 20 | 21 | 27 |
| Heat Aging: | | | | | | | | | | | | | |
| 3 days at 200° C. | | | | | | | | | | | | | |
| Tensile strength, MPa | 18.77 | 19.64 | 6.23 | 5.91 | — | 8.25 | — | — | 3.68 | 3.88 | 9.32 | 10.04 | 10.83 |
| Elongation, % | 255 | 227 | 112 | 65 | — | 258 | — | — | 203 | 115 | 372 | 200 | 523 |
| 100% modulus, MPa | 5.67 | 8.56 | 5.48 | — | — | 2.98 | — | — | 2.63 | 3.23 | 4.84 | 5.21 | 2.02 |
| Hardness, Shore A | 82 | 91 | 78 | 85 | — | 71 | — | — | 74 | 61 | 75 | 80 | 64 |
| 7 days at 200° C. | | | | | | | | | | | | | |
| Tensile strength, MPa | 16.54 | 18.44 | 6.35 | 5.96 | — | 7.23 | — | — | 3.45 | 3.65 | 8.79 | 9.40 | 9.45 |
| Elongation, % | 215 | 237 | 117 | 77 | — | 270 | — | — | 227 | 128 | 297 | 208 | 548 |
| 100% modulus, MPa | 6.12 | 7.85 | 5.22 | — | — | 2.60 | — | — | 2.35 | 2.62 | 4.40 | 4.83 | 1.79 |
| Hardness, Shore A | 81 | 87 | 77 | 87 | — | 70 | — | — | 76 | 61 | 81 | 81 | 63 |
| 14 days at 200° C. | | | | | | | | | | | | | |
| Tensile strength, MPa | 18.31 | 18.37 | 5.27 | 5.64 | — | 6.72 | — | — | 2.99 | 3.44 | 7.92 | 7.36 | 8.61 |
| Elongation, % | 247 | 255 | 107 | 78 | — | 277 | — | — | 250 | 117 | 312 | 180 | 605 |
| 100% modulus, MPa | 5.56 | 7.02 | 4.89 | — | — | 2.38 | — | — | 1.96 | 2.72 | 3.80 | 4.46 | 1.52 |
| Hardness, Shore A | 80 | 88 | 78 | 87 | — | 69 | — | — | 77 | 60 | 80 | 81 | 63 |
| Heat Aging: | | | | | | | | | | | | | |
| 3 days at 232° C. | | | | | | | | | | | | | |
| Tensile strength, MPa | 12.37 | 19.75 | 4.09 | 5.53 | — | 5.01 | — | — | 2.52 | 2.60 | 7.52 | 7.89 | 6.86 |
| Elongation, % | 313 | 312 | 93 | 83 | — | 290 | — | — | 270 | 128 | 312 | 218 | 647 |
| 100% modulus, MPa | 3.40 | 6.57 | — | — | — | 2.01 | — | — | 1.85 | 1.99 | 3.99 | 4.07 | 1.25 |
| Hardness, Shore A | 77 | 90 | 77 | 86 | — | 67 | — | — | 74 | 58 | 78 | 82 | 60 |
| 7 days at 232° C. | | | | | | | | | | | | | |
| Tensile strength, MPa | 11.23 | 11.98 | 2.15 | 4.41 | — | 5.38 | — | — | 3.07 | 2.11 | 4.91 | 4.72 | 5.65 |
| Elongation, % | 412 | 390 | 68 | 78 | — | 335 | — | — | 347 | 113 | 357 | 240 | 673 |
| 100% modulus, MPa | 2.44 | 3.84 | — | — | — | 2.25 | — | — | 1.99 | 1.92 | 2.72 | 2.76 | 1.17 |
| Hardness, Shore A | 77 | 87 | 73 | 86 | — | 71 | — | — | 76 | 58 | 78 | 79 | 60 |
| 14 days at 232° C. | | | | | | | | | | | | | |
| Tensile strength, MPa | 8.66 | 10.94 | 1.79 | 2.50 | — | 5.12 | — | — | 4.28 | 2.25 | 2.52 | 2.60 | 5.05 |
| Elongation, % | 400 | 440 | 60 | 25 | — | 293 | — | — | 418 | 95 | 408 | 258 | 603 |
| 100% modulus, MPa | 2.36 | 3.38 | — | — | — | 2.51 | — | — | 2.01 | — | 1.82 | 1.97 | 1.23 |
| Hardness, Shore A | 79 | 86 | 76 | 84 | — | 79 | — | — | 78 | 61 | 75 | 75 | 66 |

*Fluoropolymer designations A, B, etc., correspond to those in Table I
**The numbered designations of the vulcanized products correspond to the numbered designations of the gumstocks of Table III To illustrate further aspects of this invention, in a series of seven runs, fluoropolymer A (whose composition is set forth in Table I) was blended with varying amounts of fluorosilicone gum and various other compounding adjuvants, the blends were press-cured at 177° C. for 15 minutes at 5 MPa, post-cured at 200° C. 16 hours, heat aged for different periods of time at 200° C. and 232° C. and the properties of the various cured and aged vulcanizates were determined. These runs are summarized in Table VI.

TABLE VI

| | 25 | 26 | 27 | 28 | 29 | 30 | 31 |
|---|---|---|---|---|---|---|---|
| Gumstock ingredients, parts: | | | | | | | |
| Fluoropolymer gum A | 20 | 40 | 85 | 90 | 80 | 60 | 60 |
| Fluorosilicone gum$^a$ | 80 | 60 | 15 | 10 | 20 | 40 | 40 |
| Silica$^b$ | 26.5 | 26.5 | 20 | 20 | 15 | 26.5 | |
| Iron Oxide$^c$ | | | | | 2.5 | | 60$^f$ |
| Calcium hydroxide | 3 | 3 | 3 | 3 | | 3 | 3 |
| Peroxide$^d$ | 1.3 | 1.3 | 1.3 | 1.3 | 1.3 | 1.3 | 2 |
| Triallyl isocyanurate | 1.2 | 1.2 | 1.2 | 1.2 | | | 2 |
| Properties of vulcanizate: | | | | | | | |
| Press cure$^e$: | | | | | | | |
| Tensile strength, MPa | 6.95 | 8.29 | 9.67 | 11.19 | 7.65 | 7.94 | 5.87 |
| Elongation, % | 160 | 178 | 217 | 205 | 498 | 333 | 160 |
| 100% modulus, MPa | 3.99 | 4.26 | 3.53 | 4.48 | 1.18 | 2.28 | 3.88 |
| Hardness, Shore A | 70 | 74 | 67 | 73 | 53 | 70 | 65 |
| Post cure$^e$: | | | | | | | |
| Tensile strength, MPa | 6.85 | 7.61 | 12.93 | 13.99 | 9.14 | 9.29 | 7.05 |
| Elongation, % | 150 | 152 | 200 | 180 | 443 | 247 | 110 |
| 100% modulus, MPa | 4.16 | 4.72 | 4.92 | 6.20 | 1.64 | 3.79 | 6.23 |
| Hardness, Shore A | 72 | 76 | 70 | 77 | 58 | 75 | 67 |
| Compression set: | | | | | | | |
| 70 hrs at 148° C. | 9 | 11 | — | — | 24 | 23 | — |
| 70 hrs at 200° C. | 36 | 35 | — | — | 64 | 60 | — |
| $TR_{10}$, °C. | −52 | −29 | −20 | −20 | −21 | −23 | — |
| Volume Swell, vol. % | 24 | 23 | 19 | 18 | 24 | 25 | — |
| Heat Aging: | | | | | | | |
| 3 days at 200° C. | | | | | | | |
| Tensile strength, MPa | 5.80 | 5.45 | — | — | 8.78 | 9.13 | — |

TABLE VI-continued

|  | 25 | 26 | 27 | 28 | 29 | 30 | 31 |
|---|---|---|---|---|---|---|---|
| Elongation, % | 147 | 127 | — | — | 440 | 240 | — |
| 100% modulus, MPa | 3.48 | 4.21 | — | — | 1.77 | 4.02 | — |
| Hardness, Shore A | 72 | 78 | — | — | 58 | 77 | — |
| 7 days at 200° C. | | | | | | | |
| Tensile strength, MPa | 5.72 | 6.00 | — | — | 7.38 | 8.72 | — |
| Elongation, % | 150 | 123 | — | — | 460 | 217 | — |
| 100% modulus, MPa | 3.40 | 4.59 | — | — | 1.73 | 4.39 | — |
| Hardness, Shore | 71 | 79 | — | — | 58 | 79 | — |
| 14 days at 200° C. | | | | | | | |
| Tensile strength, MPa | 4.86 | 5.90 | — | — | 5.02 | 5.05 | — |
| Elongation, % | 135 | 135 | — | — | 420 | 210 | — |
| 100% modulus, MPa | 3.39 | 4.27 | — | — | 1.23 | 3.94 | — |
| Hardness, Shore A | 71 | 78 | — | — | 58 | 76 | — |
| Heating Aging: | | | | | | | |
| 3 days at 232° C. | | | | | | | |
| Tensile strength, MPa | 4.34 | 5.23 | — | — | 4.85 | 7.58 | — |
| Elongation, % | 152 | 138 | — | — | 174 | 243 | — |
| 100% modulus, MPa | 2.72 | 4.01 | — | — | 3.56 | 3.69 | — |
| Hardness, Shore A | 69 | 77 | — | — | 58 | 76 | — |
| 7 days at 232° C. | | | | | | | |
| Tensile strength, MPa | 3.30 | 3.94 | — | — | 5.58 | 6.61 | — |
| Elongation, % | 153 | 135 | — | — | 573 | 220 | — |
| 100% modulus, MPa | 2.17 | 3.03 | — | — | 1.32 | 3.72 | — |
| Hardness, Shore A | 68 | 77 | — | — | 58 | 78 | — |
| 14 days at 232° C. | | | | | | | |
| Tensile strength, MPa | 1.36 | 1.90 | — | — | 5.61 | 4.27 | — |
| Elongation, % | 122 | 103 | — | — | 563 | 327 | — |
| 100% modulus, MPa | 1.27 | 1.84 | — | — | 1.14 | 2.52 | — |
| Hardness, Shore A | 65 | 75 | — | — | 61 | 74 | — |

$a$"Silastic" LS-420
$b$Silica used in runs 25, 26 and 30 was 20 parts "Aerosil" R-972 and 6.5 parts "Cab-O-Sil" HS-5, in runs 27 and 28 it was "Quso" G-32, in run 29 it was "Aerosil" R-972
$c$"Mapico" 297
$d$"Luperco" 130XL in runs 25, 26, 29, and 30 and "Luperco" 101XL in runs 27, 28, and 31
$e$Values for runs 25-2 are average of two determinations
$f$This 60 parts was a "Mapico Tan" 10, a mixture of 67% iron oxide and 33% zinc oxide Various modifications and alterations of this invention will be apparent to those skilled in the art without departing from the scope and spirit of this invention and the latter should not be restricted to that set forth herein for illustrative purposes.

What is claimed is:

1. A fluoropolymer gum whose interpolymerized units consist essentially of 60 to 85 mol percent of units derived from vinylidene fluoride, 10 to 40 mol percent of units derived from hexafluoropropene, and 0.15 to 3 mole percent of units derived from 1-bromo-2,2-difluoroethylene, which gum cures in the presence of free-radical initiators under vulcanization conditions to produce an elastomeric vulcanizate.

2. The fluoropolymer gum according to claim 1 wherein said fluoropolymer gum has interpolymerized units consisting of 65 to 82 mol percent units derived from vinylidene fluoride, 17 to 35 mole percent of units derived from hexafluoropropene, and 0.2 to 0.6 mole percent units derived from 1-bromo-2,2-difluoroethylene.

3. The fluoropolymer gum according to claim 1 wherein said fluoropolymer gum has interpolymerized units consisting of about 78 mol percent units derived from vinylidene fluoride, about 21 mole percent of units derived from hexafluoropropene, and about 0.3 mole percent units derived from 1-bromo-2,2-difluoroethylene.

* * * * *